Nov. 12, 1940.  N. N. OKUN  2,221,553
WHEEL
Filed Dec. 21, 1936  2 Sheets-Sheet 1
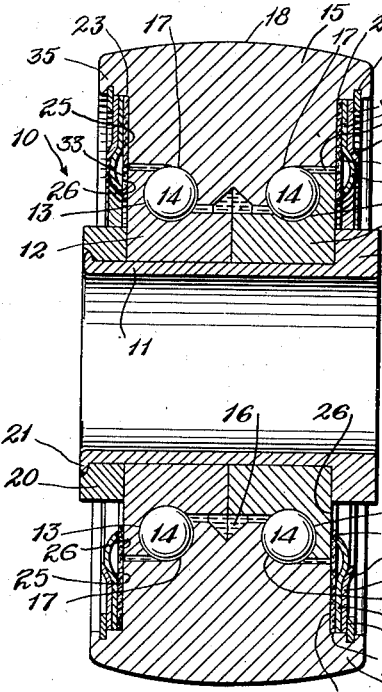
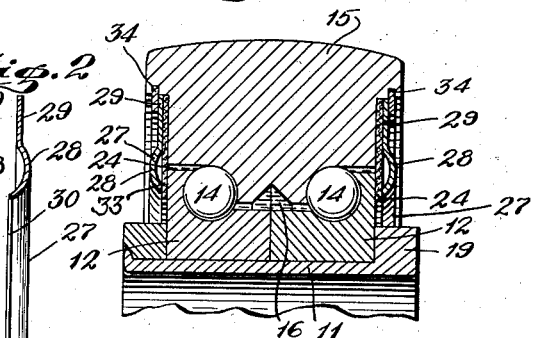
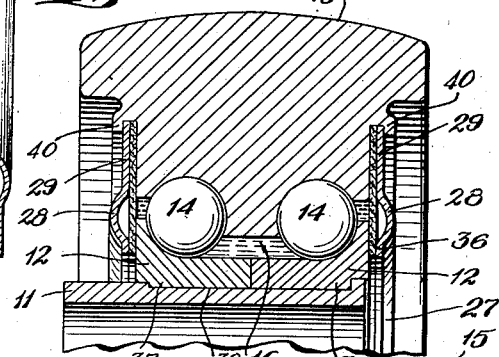
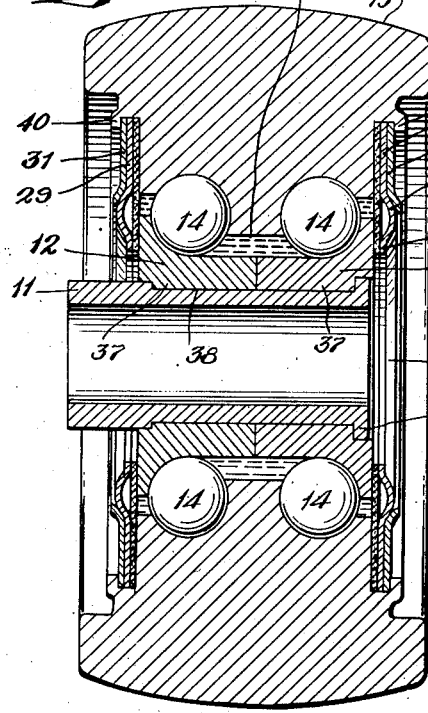
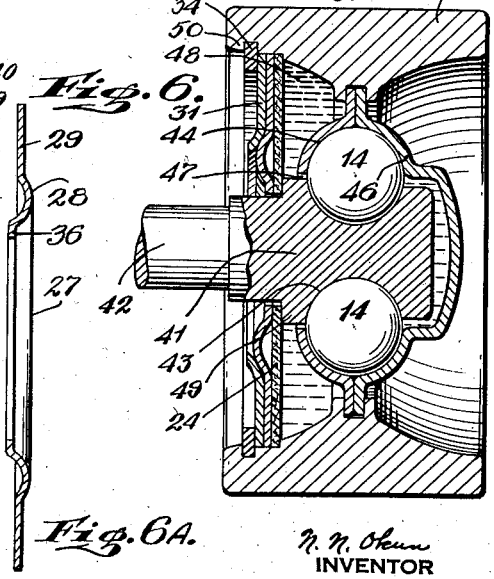
N. N. Okun
INVENTOR
BY
ATTORNEY

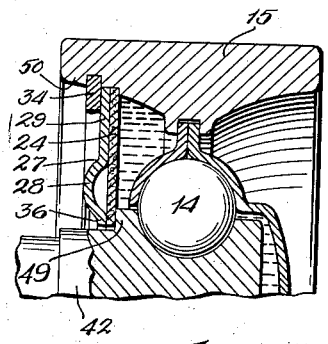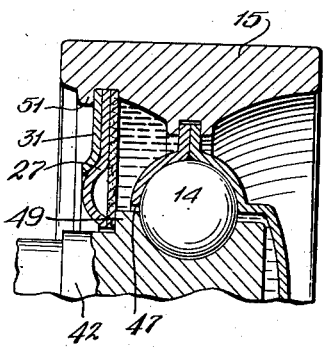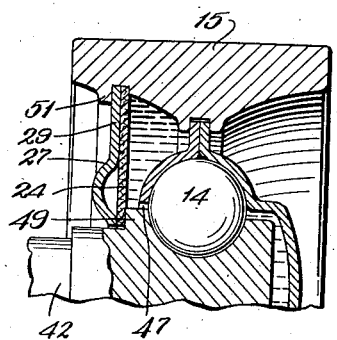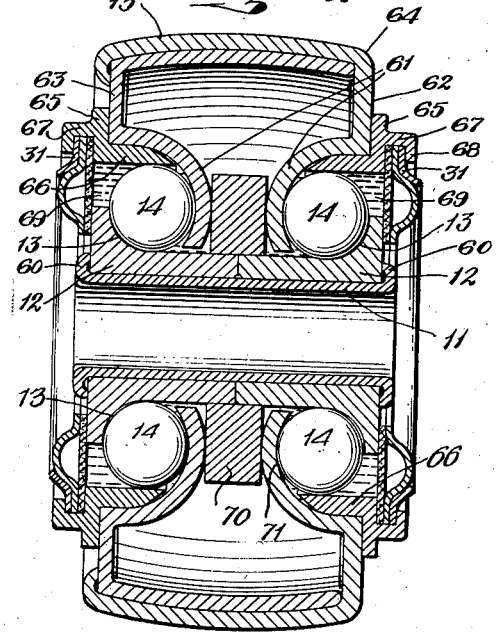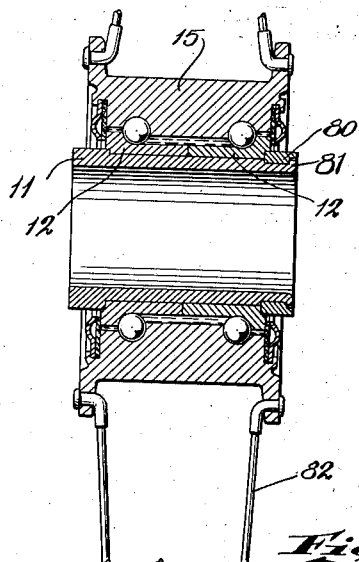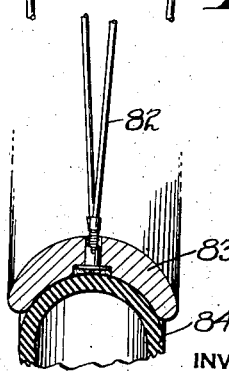

Patented Nov. 12, 1940

2,221,553

UNITED STATES PATENT OFFICE 2,221,553

WHEEL

Nathaniel N. Okun, New York, N. Y., assignor of one-third to Charles M. Palmer, Washington, D. C.

Application December 21, 1936, Serial No. 117,073

7 Claims. (Cl. 308—187.1)

The present invention relates in general to wheels and particularly is concerned with anti-frictionally supported skate wheels although the invention in its broadest aspect is not limited in this respect.

The primary object of the invention is to provide a functionally and structurally improved anti-frictionally supported wheel wherein an initial charge of lubricant is prevented from draining out of the companion races of the wheel and wherein dust, grit and dirt is prevented from entering the races.

With the above and other objects in view, the invention further resides in the details of construction and arrangement of parts hereinafter more specifically pointed out in the following detailed description of the accompanying drawings in which—

Fig. 1 is a longitudinal vertical sectional view of my improved skate wheel according to the invention.

Fig. 2 is a sectional view of a beaded and relatively thin resilient metal ring.

Fig. 3 is a fragmentary view of Fig. 1, however slightly modified.

Fig. 4 is a longitudinal and vertical sectional view of another wheel.

Fig. 5 is a fragmentary view of Fig. 4, however slightly modified.

Fig. 6 is a sectional view of another modified wheel.

Fig. 6A is a sectional view of the beaded spring or reinforced metal ring employed in connection with Figs. 4, 5 and 6.

Fig. 7 is a fragmentary view of Fig. 6 however slightly modified.

Fig. 8 is a view similar to Fig. 7 but slightly modified.

Fig. 9 is a view similar to Fig. 8 but slightly modified.

Fig. 10 is a longitudinal sectional view of another form of skate wheel.

Fig. 11 is a fragmentary view of Fig. 10 however slightly modified, and

Fig. 12 is a broken, vertical, sectional, and fragmentary view of a bicycle wheel.

Illustrative of the several embodiments disclosed, the skate wheel generally denoted 10 shown in Fig. 1 comprises, an annular sleeve or bushing 11 which serves as a bearing for a fixed shaft (not shown). As shown juxtapositioned annular complementary shoes 12 are fixedly mounted on bushing 11. Each shoe 12 is provided with an annular groove 13. A plurality of anti-friction rotatable members 14 are arranged in each annular groove 13. These rotatable anti-friction members may be, metal balls, rollers, or pins, of the type well known in the art. Although only balls have been illustrated, the invention comprehends the utilization of other anti-friction rolling means. These balls also serve to space the annular rim 15 of the wheel from shoes 12 providing an irregular but annular channel or gap 16 in which lubricant, such as oil or grease is disposed. The balls also cooperate with annular grooves 17 in the annular rim 15 which includes a tread portion 18 adapted to roll on a supporting surface (not shown) whereby rim 15 rotates relative to shoes 12 and bushing 11.

In assembling, shoes 12, which in fact, constitute the fixed race of the anti-friction bearing defined by the spaced races are frictionally slid or forced onto bushing 11 until limited by annular flange or hub 19. Balls 14 are arranged in the grooves 13 of the shoes. Rim 15 is placed over the balls 14. Annular ring or hub 20 is forced onto the bushing and the latter is swaged or upset to provide annular lip 21 wedgeably engaging clamping ring 20. By the present arrangement the companion and juxtapositioned shoes 12 are firmly held together between hubs 19 and 20, and rim 15 which constitutes the rotatable race of the anti-friction bearing, rotates on the rotatable balls 14.

According to the invention, effective elastic seals or connections are provided between the shoes 12 of the fixed race, and rotatable race of the wheel to prevent the lubricant shown in dash lines from draining out of channel 16 defined by the relatively rotatable and spaced races. The elastic connections also prevent dust and dirt from entering the irregularly shaped annular channel 16. For this purpose, each side of the rim of the wheel is provided with an annular groove 23 against which is placed an annular relatively hard fibre sealing ring or washer 24, which if desired may be of a relatively thin Bakelite. More particularly fibrous or Bakelite washer 24 is placed against an abutment vertical wall 25 defined by annular groove 23. This washer overlaps a relatively flat outside vertical but straight end face 26 of an adjacent fixed shoe 12 and seals or closes one end of the lubricant channel 16.

For holding washer 24 against the fixed and movable races of the wheel, an annular spring or yieldable metal ring 27 is provided. Ring 27 is a one piece member and includes a bead 28 having an outer rectilinear marginal portion 29 which is normally out of alinement with the inner portion or free lip 30 thereof. Resilient and flexible ring 27 is placed against washer 24 and a pressure exerting annular spring or thin metal thrust ring 31 is placed against the ring 27 in such a way that the outwardly extending and curved lip 32 of the pressure exerting ring 31 abuts the annular curved bead 28 flexing the latter and causing inner lip 30 thereof to be disposed substantially in the plane of its associated outer margin 29 from which it depends.

With bead 28 distorted slightly by pressure ring 31, the inner overlapping portion 33 of washer 24 is held in yieldable and elastic abutting relation against an associated outside face 26 of the fixed race. A snap ring 34 is appropriately fixed in each overhanging portion 35 of the rim of the wheel, to anchor and firmly hold the outer marginal portion of the pressure exerting ring 31 against margin 29 of beaded ring 27 and the latter firmly against the sealing washer 24. When thus locked to the fixed race, washer 24 of the elastic seal or connection yielding bears against the fixed race and is so held by the pressure imparted by the outwardly curved lip 32 of the thrust ring 31 onto beaded ring 27 although the rotatable race revolves about the fixed race, thus providing a resiliently actuated closure for the lubricating channel 16 between the fixed and movable races of the wheel.

Since each side of the wheel is provided with a locked but elastic connection or seal, it is apparent the lubricant is retained and kept continuously packed in annular channel 16 and is prevented from draining out therefrom and by reason of such elastic connections it also follows that dirt is prevented from entering this channel.

According to the form illustrated in Fig. 3, the pressure exerting resilient or thrust ring 31 of the type shown in Fig. 1, is omitted. In Fig. 3, the pressure resulting from the deformed bead 28 is utilized to yielding and elastically hold an associated washer 24 against one end of the fixed race, and the snap ring 34 locks a companion beaded ring 27 against the washer. In other aspects the construction illustrated in Fig. 3, is identical to the wheel shown in Fig. 1 although with the form disclosed by the latter, a greater pressure may be imparted to the sealing washer 24.

In Fig. 4, the elastic connections or lubricant seals are substantially along the lines of the showing in Fig. 1. In Fig. 4, however beaded spring rings 27 are each provided with an inner annular flange or lip 36 normally out of alinement with outer margin 29 thereof. When assembled however a bead 28 is deformed and its lip 36 is disposed in alinement with the outer margin 29 and yielding and elastically bears against washer 24 of the elastic or yieldable sealing connection.

As shown in Fig. 4, juxtapositioned shoes 12 are provided with bosses 37 fixedly held in the annular channel or groove 38 of the bushing 11. Shoes 12 are slidably forced or keyed on bushing 11 to rotate therewith. After they are appropriately positioned flange 39 may be forced or swaged to prevent displacement of the shoes 12 longitudinally of the bushing.

Also in Fig. 4 metal snap rings, such as 34 shown in Fig. 1 are not used. Instead, the reduced part of the rotatable race is provided with annular flanges 40 which are swaged or bent against the pressure or thrust rings 31 to anchor the latter against beaded ring 27 and the latter against the washer.

With the anti-frictionally supported wheel according to Fig. 6, fixed race 41 is a part of shaft 42 adapted to be fixedly held by means not shown. This race includes an annular groove 43 which cooperates with annular groove 44 of the rotatable race 46 carried by rim 15 of the wheel to rotatably confine anti-frictional rollers or balls 14 to permit rim 15 and its race 46 to freely rotate relative to the fixed bearing 41. In actual practice, relatively rotatable races 41 and 46 form an annular gap 47 and obviously lubricant 48 within the housing or race 46 drains through gap or channel 47 and in a short time the wheel operates "dry." Dirt also enters into this gap as in the case of the gap or channel 16 illustrated and described in connection with the embodiments with Figs. 1-4 inclusive, causing the balls and the grooves of the races to wear, ultimately also causing the wheel to wobble.

Since the outer rotatable race or housing 46 encloses one end of the fixed race only one seal of the type shown in Fig. 1 is provided in the form according to Fig. 6. In this respect, however, annular washer 24 cooperates with annular shoulder 49 of the fixed bearing to seal gap 47 while a metal snap ring 34 is utilized to hold pressure or thrust ring 31 against the ribbed or beaded metal ring 27 and the latter against the annular washer 24. The snap ring 34 is held in place by the swaged annular flange or inwardly bent lip 50.

In the form illustrated in Fig. 7, the pressure or thrust ring 31 is eliminated and snap ring 34 anchors the beaded ring 27 against the Bakelite ring 24. In other aspects Fig. 7 shows a wheel identical to the form illustrated in Fig. 6.

In Fig. 8, an annular flange 51 integral with rim 15 of the wheel serves to fasten the elastic lubricant seal or connection in this instance comprising flexible and resilient pressure or thrust ring 31, flexible and resilient beaded ring 27 and the annular washer 24 which in part overlaps annular shoulder 49 and is rotatable relative thereto but yieldingly in abutting relation therewith. In Fig. 9 the pressure ring 31 is omitted. Otherwise, the embodiment illustrated thereby is identical to the form shown in Fig. 8 except that flange 51 is forced against the outer marginal part 29 of the beaded ring 27.

The wheel in Fig. 10 has its juxtapositioned shoes 12 of the fixed race firmly secured to bushing 11 by swaging or forcing annular flanges 60 against the outer vertical faces thereof. The rotatable race of the wheel however is defined inwardly curved sides 62 and 63 constituting a hollow shell generally denoted 64 to which is fixedly attached the spaced annular collars 65 each having an inwardly directed annular flange 66 adapted to movably contact balls 14 and comprising an overhanging laterally extending annular flange 67 which has its terminal bent or swaged inwardly to a retaining lip 68 to appropriately anchor the parts of the elastic or resilient lubricant seal or connection of the type shown in Figs. 4 and 8 although it is to be understood that any of the other types of elastic sealing connections herein disclosed may be also utilized if desired for operatively closing annular lubricant channels 69 defined by the fixed and rotatable races. In Fig. 10, an annular ring 70 serves as a spacer for the slightly flexible and curved portions 61 and aids to yielding hold their grooves 71 against the rotatable balls 14 and the latter against grooves 13 of the fixed race.

Concerning Fig. 11, the embodiment thereof is identical to the showing of Fig. 10, except that the elastic sealing connections are without the pressure or thrust springs 31.

In Fig. 12, a sectional and broken view of a wheel of a velocipede is shown. Particularly a wheel of a bicycle is illustrated in part. On the bushing 11, shoes 12 are non-rotatably held and are clamped together by ring 80 which is anchored by the swaged lip 81. The rotatable race 15 hitherto constituting the tread of a skate wheel however is now used to sustain spokes 82 also secured to rim 83 of the wheel on which the pneumatic tube 84 is sustained. In other aspects the elastic lubricant seal at each end of the bearing constituted by the fixed and rotatable races may be along the lines of any of the previous forms disclosed, but as shown, is along the lines illustrated and described in connection with the embodiment of Fig. 5.

It is apparent therefore that the several embodiments herein disclosed each show elastic sealing means to prevent lubricant from draining from the lubricant channel between the fixed and rotatable races which in association with the rotatable or revolvable members 14 constitute an anti-friction bearing and these seals also preclude grit or dirt to enter the lubricating channel, thus preventing wear of the balls and races and providing continuous, smooth and relatively quiet operation of the rotatable race relative to the fixed race.

If desired, the free edge of lip 30 may be rounded but before assembled it normally is out of alinement with the outer flange 29 of its beaded ring 27.

In the broader aspects of the invention, I do not desire to be understood as limiting its embodiments to details herein shown illustratively as a wide variety of modifications may be made within the scope of the appended claims without departing from the spirit of the invention, for example, although roller skate and bicycle wheels showings have been made the invention is not limited to these devices but is equally applicable to any and all wheels having an anti-friction bearing comprising a fixed and rotatable race.

I claim:

1. A seal for a wheel with a fixed race having a radial side face spaced from a movable race to provide a gap, said seal comprising an annular disc for closing said gap and disposed in part against said face, annular diaphragm spring means disposed in close juxtaposition and directly cooperating with said disc and comprising an annular hollow bead, and means for holding said disc and spring means fixedly to said movable race and for deforming said bead for holding said disc yieldingly against said face.

2. A seal for a wheel with a fixed race having a radial side face spaced from a movable race to provide a gap, said seal comprising closure means disposed against said movable race and against said side face, a beaded ring having a pair of oppositely extending ends disposed out of alinement, and means for holding one of said ends fixedly against said closure means to hold the latter fixedly against said movable race to permit the other end of said pair to yieldingly bear against said closure means to hold the latter yieldingly against said face.

3. A seal for a wheel with a fixed race having a radial side face spaced from a movable race to provide a gap, said seal comprising annular flexible closure means for said gap secured to said movable race and disposed in part against said face, annular spring means comprising an annular reflexed portion, and means for holding a part of said spring means against said closure means to distort said reflexed portion and yieldingly hold another part of said spring means against said closure means to yieldingly hold the latter against said face.

4. A seal for a wheel with a fixed race having a radial side face spaced from a rotatable race to provide a gap, said seal comprising annular flexible closure means for said gap secured to said rotatable race and disposed in part against said face, annular spring means comprising normally offset marginal portions and an annular bead merging with said marginal portions, and means for fixedly holding one of said marginal portions against said closure means to deform said bead and urge another of said marginal portions yieldingly against said closure means and the latter yieldingly against said face.

5. A seal for a wheel with a fixed race having a radial side face spaced from a rotatable race to provide a gap, said seal comprising annular means for closing said gap, annular spring means comprising offset marginal portions and an intermediately disposed annular bead integral and merging with said portions, and means for fixedly holding one of said marginal portions against said annular means for slightly deforming said bead to permit another of said marginal portions to provide radial pressure relative to and against said annular means to dispose the latter yieldingly against said face.

6. A seal for a wheel with a fixed race having a radial side face spaced from a rotatable race to provide a gap, said seal comprising resilient and annular closure means disposed against said rotatable race and against said side face, a flexible ring having an annular bead, and means for holding a part of said ring fixedly against said closure means and for tensioning said bead to hold another part of said ring yieldingly against said closure means to yieldingly hold the latter against said face.

7. A seal for a wheel with a fixed race having a radial side face spaced from a movable race to provide a gap, said seal comprising resilient and annular closure means disposed against said movable race and in part against said face, a flexible ring having an annular bead, and means for holding a part of said ring fixedly against said closure means and for tensioning said bead to hold another part of said ring yieldingly against said closure means for holding the latter yieldingly against said face.

NATHANIEL N. OKUN.